United States Patent [19]

Leclercq

[11] Patent Number: 4,655,990
[45] Date of Patent: Apr. 7, 1987

[54] FUEL ASSEMBLIES FOR NUCLEAR REACTORS

[75] Inventor: Joseph Leclercq, Saint Didier, France

[73] Assignees: Commissariat A L'Energie Atomique, Paris; Framatome, Courbevoi, both of France

[21] Appl. No.: 242,454

[22] Filed: Mar. 11, 1981

[30] Foreign Application Priority Data

Mar. 26, 1980 [FR]  France ............................ 80 06695

[51] Int. Cl.⁴ ............................................... G21C 7/20
[52] U.S. Cl. .................................... 376/225; 376/353; 376/446
[58] Field of Search ............... 376/224, 225, 234, 353, 376/449, 446, 463, 352

[56] References Cited

U.S. PATENT DOCUMENTS 3,562,109  2/1971  Bezold et al. .................. 376/234
3,773,617 11/1973  Marmonier et al. ............ 376/234 X
3,791,466  2/1974  Patterson et al. .............. 376/449 X
3,915,793 10/1975  Andersson et al. ............ 376/449
4,229,256 10/1980  Luetzow ......................... 376/225
4,284,475  8/1981  Anthony ......................... 376/446 X
4,302,294 11/1981  Leclercq ........................ 376/446

Primary Examiner—Deborah L. Kyle
Assistant Examiner—Dan Wasil
Attorney, Agent, or Firm—Dennis P. Clarke

[57] ABSTRACT

Improvements to guide tubes for the fuel assemblies of light water nuclear reactors, said assemblies being immersed in operation in the cooling water of the core of such a reactor, the guide tubes being of the type made from zircaloy and fixed at their two ends respectively to an upper end part and a lower end part made from stainless steel or Irconel and which incorporate devices for braking the fall of the control rods which they house during the rapid shutdown of the reactor, wherein the said braking devices are constituted by means for restricting the diameter of the guide tubes comprising for each guide tube a zircaloy inner sleeve spot welded to the said guide tube and whose internal diameter permits the passage, with a calibrated clearance, of the corresponding control rod, the sleeve being distributed over the lower portion of each guide tube and associated with orifices made in the actual guide tubes to produce the progressive hydraulic absorption of the end of the fall of the control rods.

The invention also relates to a process for the disassembly of the guide tubes of a fuel assembly.

2 Claims, 7 Drawing Figures

FUEL ASSEMBLIES FOR NUCLEAR REACTORS

BACKGROUND OF THE INVENTION

The present invention relates to fuel assemblies for nuclear reactors and more particularly to fuel assemblies for reactors cooled with light water.

Even more specifically the present invention relates to improvements to the guide tubes of such fuel assemblies and brief details will be given below of the construction thereof.

Reference can be made to French Patent Nos. 1 536 527 and 70 18 102 in the name of the Westinghouse Electric Corporation for details of fuel assemblies for light water reactors of a known type. In components of the type described in these Patents the nuclear fuel of the reactor is distributed over a plurality of fuel rods located in the reactor core, the contiguous assemblies having a generally square cross-section. Each fuel assembly extends over a length of several meters and has a rigid mechanical frame, being held between the upper and lower core plates. This frame comprises an upper and a lower end part provided with orifices permitting the passage of the cooling water which circulates vertically from bottom to top and a certain number of guide tubes which, through their fixture to the upper and lower end parts, ensure the strength and stability of the assembly. Along each assembly there is a certain number of supporting grids fixed to the guide tubes and defining cells with a square cross-section permitting the passage and the transverse support of the actual fuel rods which are, so to speak, suspended by friction in the grids without contact with the upper and lower end parts.

As is known, in addition to their mechanical supporting function with respect to the assembly, the guides tubes serve to house the absorbent rods which can be used at any time for checking the chain reaction and which are inserted as rapidly as possible into the assembly across the upper part which is perforated for this purpose when, for any random reason, it is desired to bring about a rapid stoppage of reactor operation.

Conventionally the end parts of the fuel assembly are made from stainless steel or Inconel, i.e. materials having a relatively high neutron absorption, whilst the guide tubes are made from zircaloy, which has much more favourable neutron properties.

In the known fuel assemblies referred to hereinbefore it is also necessary to provide for the guide tubes braking devices which, during the rapid shutdown of the reactor, make it possible to significantly decelerate a speed at which the control rods drop at the end of travel thereof in their different guide tubes. In the hitherto known constructions this braking action is obtained by a constriction in the lower portion of the guide tube, e.g. at a certain height above the lowest grid and orifices are positioned above this constriction area to permit the removal from the guide tube of the water displaced during the fall of the control rod.

Moreover, in said same hitherto known solutions, the guide tube is fixed to the upper end part of the assembly by means of an intermediate sleeve made from a material compatible with that of the end part, because it is not possible to directly weld the zircaloy guide tube to the steel or Inconel part. As a result it is necessary to use a steel sleeve fixed to the outer surface of the upper portion of the guide tube and held by means of a certain number of mechanical deformations ensuring the fixture of the sleeve to the guide tube. The sleeve is itself welded or brazed on the one hand to the upper end part and on the other hand to the upper grid, thus ensuring the mechanical connection of the end part to the overall structure.

However, these arrangements lead to a certain number of serious disadvantages, which will be enumerated hereinafter.

Firstly the guide tubes must be manufactured in two parts of different diameters connected by a generally conically constricted area, which is difficult and requires particularly precise tooling and production controls. Moreover, the braking obtained in this way at the end of the drop of the control rods is not progressive and occurs relatively suddenly on clearing the constriction, which, in certain cases, can be highly disadvantageous for the rod. In addition, the use of a connection by welding or brazing between the upper grid and the upper end part by means of a steel sleeve imposes, for reasons of metallurgical compatibility, a steel or Inconel grid, which is highy prejudicial to the neutron balance of the reactor.

BRIEF SUMMARY OF THE INVENTION

The present invention relates to improvements to guide tubes for fuel assemblies for light water nuclear reactors which, by particularly simple means, make it possible to obviate the disadvantages referred to hereinbefore whilst at the same time providing a certain number of by no means negligible, complementary advantages.

These improvements are characterized in that the devices for braking the control rods in the corresponding guide tubes are constituted by means for reducing the diameter of said guide tubes distributed over the lower portion of their height and associated with orifices made in the guide tubes themselves in order to produce a progressive hydraulic absorption of the end of the dropping action of the control rods.

According to an improtant feature of the invention the guide tube diameter restricting means are usually joined to said tubes which, during manufacture, makes it possible to produce the tubes with a constant diameter from end to the other.

Moreover, as the guide tube diameter restricting means according to the invention are distributed over a certain area of the lower portion of the tubes (e.g. over approximately 1/7 of their height), the braking obtained is much more progressive than in the hitherto known devices.

According to a first embodiment of the invention the guide tube diameter restriction means are constituted for each tube by a continuous inner zircaloy sleeve spot welded to the said guide tube and whose internal diameter permits the passage of the corresponding control rod with a calibrated clearance.

According to a second embodiment the guide tube diameter restriction means are constituted for each guide tube by a discontinuous inner sleeve formed by tubular zircaloy elements welded or crimped in each case to the said guide tube and distributed over the lower portion of the height of said guide tube and whose internal diameter permits the passage of the corresponding control rod with a calibrated clearance.

Each guide tube of a fuel assembly is fixed to the upper end part either in continuous manner by expansions in orifices provided with annular grooves made in said part or, according to the invention, by means of a metal plug fixed in a conical end bore made in said end part.

According to another important feature of the invention the guide tubes are fixed to the lower end part of the assembly by means of a plug crimped into the inner sleeve and joined to the lower part by detachable mechanical means.

Thus, by not fixing the guide tubes to the upper end part of the assembly by welding and by replacing this by a mechanical expansion-type fixing in an orifice traversing the upper end part, it is possible to facilitate fixing by eliminating the steel sleeves referred to hereinbefore in connection with the prior art. This feature also facilitates the detachment of the guide tubes from the upper end part and, after removal of the latter, permits the replacement of defectible fuel rods during maintenance of the assembly, thereby significantly extending the service life.

To this end the present invention also relates to a process for detaching the guide tubes from the upper part so as to be able to directly work on the fuel rods in a relatively simple manner which is compatible with the presence of the water required for providing protection against radiation.

This process is characterized in that for the purpose of replacing one or more defective fuel rods during a maintenance operation the upper part of the guide tube assembly is cut out beneath the expansions, the upper part removed, the defective fuel rods replaced, a new upper part equipped with a number of short tubes whose number is at the most equal to that of the guide tubes of the assembly is introduced, the internal diameter thereof being slightly larger than the external diameter of the cut-out tubes and then said short tubes, which have previously been fitted on to the corresponding guide tubes are joined with the latter by expansion-shaping.

BRIEF DESCRIPTION OF THE DRAWINGS

The invention is described in greater detail hereinafter relative to non-limitative embodiments and the attached drawings, wherein show:

FIG. 5 the second embodiment of the invention in which the guide tube diameter constriction is constituted by an internal discontinuous sleeve.

DETAILED DESCRIPTION OF THE PREFERRED EMBODIMENTS

Figure 1:
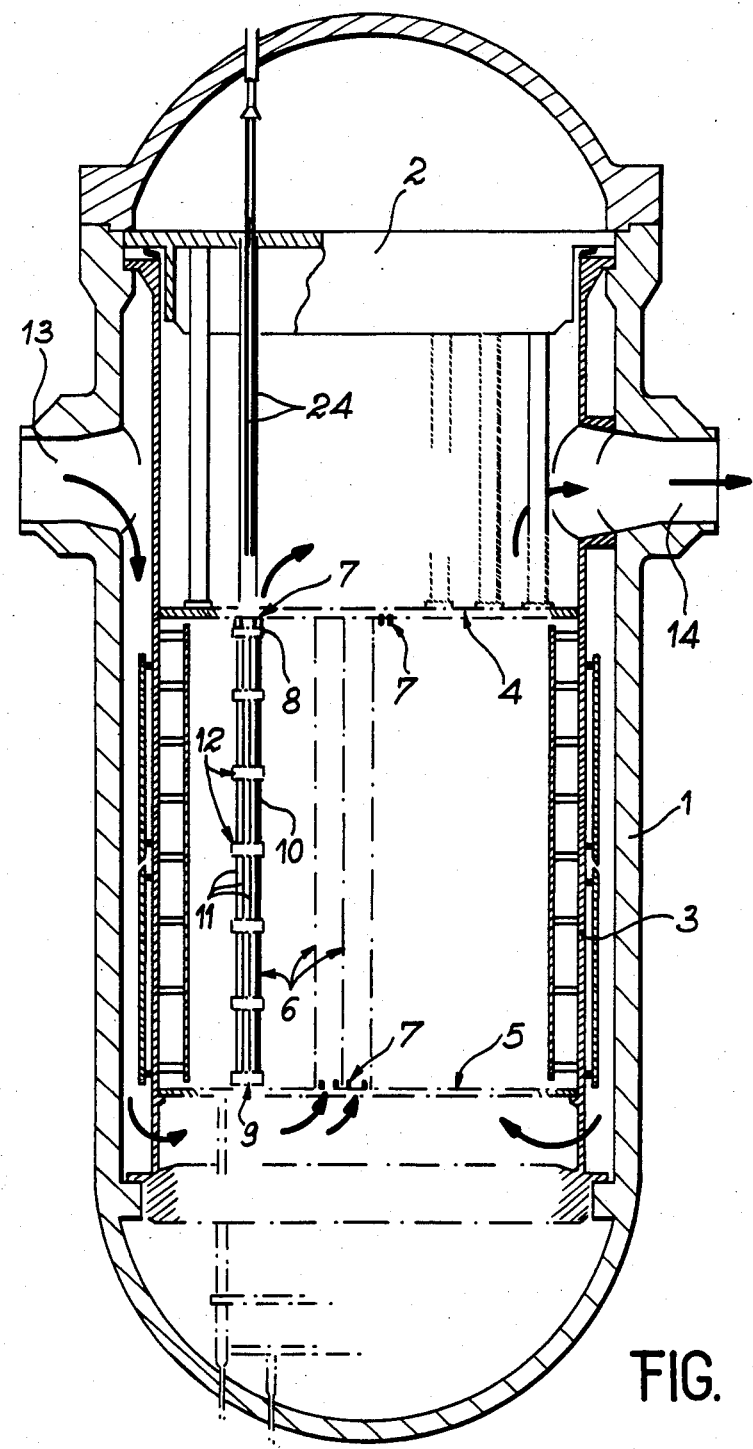
FIG 1 a known diagram for the installation of the fuel assemblies in a light water reactor core.

FIG. 1 shows the general known arrangement of the fuel assemblies of a light water reactor, whose vessel is designated 1. In vessel 1 are suspended internal equipment, constituted by upper and lower internal equipment. The upper internal equipment comprises an upper plate 2 and a lower plate 4 interconnected by spacers. The lower internal equipment comprises a ferrule 3 and a lower plate 5 joined by welding. Between plates 4 and 5 are arranged the fuel assemblies such as 6 which rest on plate 5 and are held between plates 4 and 5, with an axial clearance, by means of a certain number of centering pins such as 7. The structure of a fuel assembly 6 incorporates an upper end part 8 and a lower end part 9 and is reinforced and spaced by guide tubes such as 10, to which the present invention specifically applies. The fuel rods 11 are held in place by supporting grids 12 defining cells with a square cross-section for the passage of rods 11, the grids 12 being themselves connected to guide tubes 10. As stated hereinbefore guide tubes 10 are hollow and also serve to house the absorbent rods used for checking the chain reaction and the rapid shutdown of the reactor whenever this is necessary.

The assembly described in FIG. 1 is immersed in pressurized hot water at a temperature of approximately 300°0 and which circulates in the core between an intake 13 and an outlet 14, so that the different assemblies 6 are immersed in an upward cooling stream.

Figure 2:
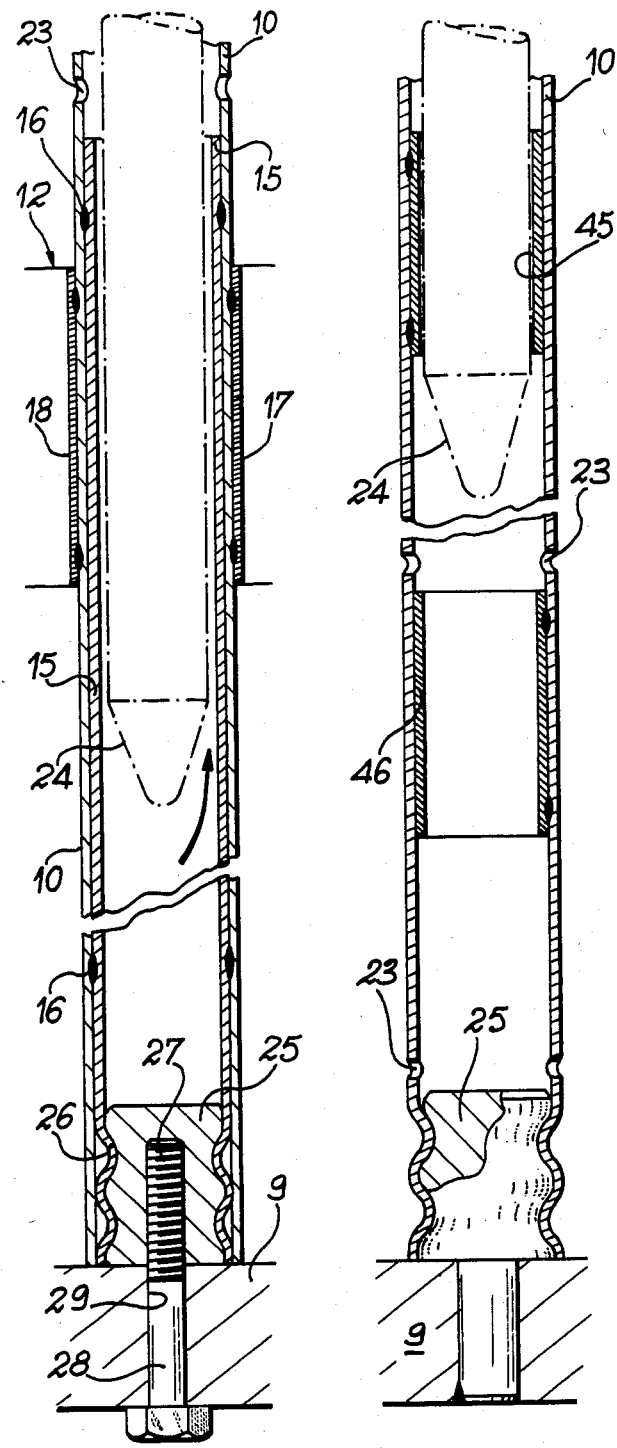
FIG. 2 an axial section of the first embodiment of the guide tube having an inner sleeve according to the invention.

In FIG. 2 is shown a guide tube 10 which, according to a first embodiment of the invention, is provided with an inner sleeve 15 which, like tube 10 is made from zircaloy and is welded to the tube at a certain number of points such as 16 by means of electrical contact welds. In the upper part of FIG. 2 it is possible to see the guide tube 10 on passing through a diagrammatically represented grid 12. In cross-section at 17 and 18 it is possible to see the two small plates of grid 12 perpendicular to the plane of the drawing and to which is fixed guide tube 10.

According to the invention guide tube 10 is provided with a certain number of orifices such as 23, which are distributed over its height, in order to permit the removal of the cooling water which it contains when a control rod, indicated by dotted lines at 24 in the drawing, descends within the sleeve 15. FIG. 2 only shows two orifices 23 at the same height, but it is obvious that, without passing beyond the scope of the invention, it is possible to adopt for the orifices 23 any arrangements in accordance with the characteristics which it is desired to obtain for progressive braking of rod 24. Thus, orifices 23 can be distributed over the entire lower part of guide tube 10 and can either be positioned above the area in which sleeve 15 commences or below said same area, or can be positioned both above and below it. Some of the orifices 23 are used for the rapid removal of the water in guide tube 10, whilst other calibrated orifices maintain at a given value the overpressure of the water in the hydraulic shock absorber constituted by guide tube 10.

FIG. 2 also shows an interesting feature of the present invention, namely the way in which the lower end part 9 is joined with the guide tube 10. To this end a stainless steel plug 25 is seated in the lower part of the inner sleeve 15 which has annular peripheral undulations 26 preventing any axial movement of plug 25 relative to inner sleeve 15. An internal thread 27 makes it possible to fix this plug by any appropriate means, such as for example a screw 28 to the lower end part 9. Screw 28 can either be a solid screw which passes through the corresponding bore 29 provided in the lower end part 9, or a hollow screw so as to also give the possibility of removing water along its axis during the drop of a control rod. This screw can also be provided with a deformable end ferrule in order to stop the rotation thereof. According to another constructional variant plug 25 is extended by means of a pin which is fitted into bore 29 and which at the outlet of said bore is welded to the lower end part 9.

Plug 25 can itself be made from zircaloy. In this case it can be welded to the inner sleeve 15, which then does not have to have undulations 26. The plug is then screwed in, as for one of the screw solutions described hereinbefore.

It can easily be gathered from FIG. 2 that the construction of the lower portion of guide tube 10 with inner sleeve 15 reduces the internal diameter of this tube which functions as a hydraulic shock absorber for control rods at the end of their travel during the fall of a cluster of said rods for the purpose of the rapid shotdown of the reactor. The orifices 23 provided at the height of the guide tube 10 ensure both the circulation of the cooling agent under normal operating conditions, and the removal of the part thereof contained within guide tube 10 during the damped fall of the control rods.

Figure 3:
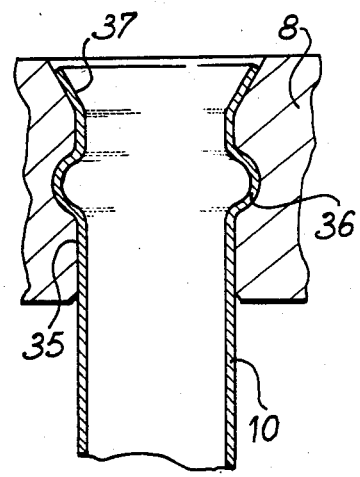
FIG. 3 a possible upper fixing method for the guide tube according to the invention.

FIG. 3 shows the connection according to the invention between the upper end part 8 and guide tube 10. In a bore 35 traversing the upper end part 8 are machined annular grooves 36, as well as bores 37. After positioning guide tube 10 in bore 35 the latter is deformed by rolling or expansion level with 36 and 37 so as to ensure its axial fixing in the upper end part 8.

Figure 4:
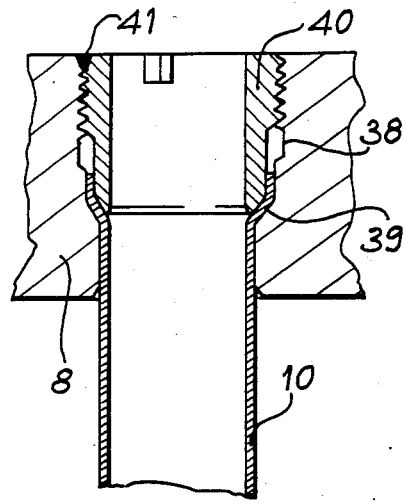
FIG. 4 another method for fixing the upper part of a guide tube according to the invention.

FIG. 4 shows a variant of the method of fixing the guide tube 10 in end part 8 in which bore 35 is simplified and replaced by a conical end milling. In this embodiment the guide tube 10 is expanded at the end of bore 38 and adopts the shape of chamfer 39. Thus, it is axially locked by a stainless steel plug 40 fitted or screwed into end part 8 and also by an outer weld 41.

FIG. 5, which shows the second embodiment of the improvements according to the invention, has the corresponding components of FIG. 2, but on this occasion the guide tube diameter restriction means comprise a certain number of internal sleeves such as 45 and 46 welded or crimped to guide tube 10. The components of FIG. 5 which are identical to those of FIG. 2 are not described again and are given the same reference numerals. However, in this case certain of the orifices 23 are calibrated.

In the embodiment of FIG. 5 plug 25 in the lower portion of guide tube 10 is no longer connected to the inner sleeve, which does not exist at this level and it is simply directly crimped or welded to guide tube 10. As in the previously described constructions orifices 23 are provided at certain levels in guide tube 10 so that, during the drop of control rods 24 a hydraulic shock absorber is formed as a result of the existence of several controlled leak locations with respect to the water occupying the interior of guide tube 10. The spatial distribution along the length of tube 10 of the various internal sleeves such as 45 and 46 ensures, according to the invention, a progressive, smooth braking of the end of the fall of the control rods. The number and length of the internal discontinuous sleeves 45, 46, as well as the number and location of the water removal orifices 23 are determined as a function of the desired braking characteristics and the desired leakage flow rate.

Figure 6:
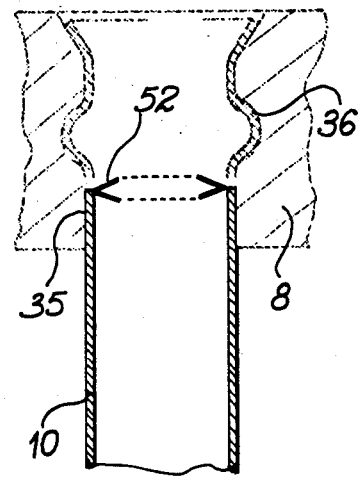
FIGS. 6 and 7 facilitate the understanding of the disassembly of the guide tubes and the replacement of defective rods.
Figure 7:
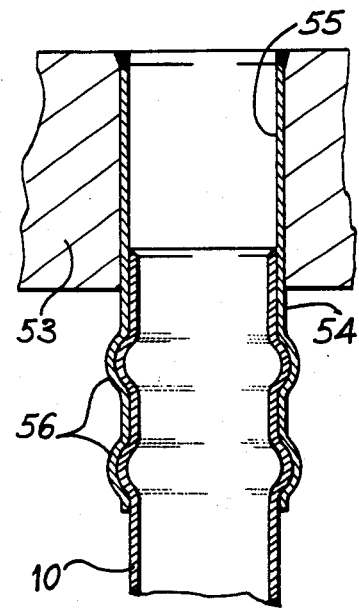

FIGS. 6 and 7 show how in the guide tube assembly procedure according to the invention it is easily possible to replace one or more fuel rods 6 by changing the upper end part 8 when a maintenance operation makes it necessary to work thereon. To disassemble upper end part 8 and obtain access to the fuel rods the following procedure is adopted. The first operation, shown in FIG. 6, consists of cutting by any known mechanical or chemical process, guide tube 10 in bore 35 level with line 52 below the deformations 36 made by expansion in said tube 10. This operation must obviously be carried out from all the guide tubes connected with said upper end part 8 and there are 24 of these in existing fuel rod assemblies in light water reactors. Once these cutting operations have been carried out the upper end part 8 is removed, which frees the assembly of the group of fuel rods and the guide tubes so as to permit any necessary maintenance to be carried out thereon.

When this operation is at an end a new upper end part 53 provided with a certain number of short tubes 54, whose internal diameter slightly exceeds the external diameter of guide tubes 10 is fitted. This makes it possible to fit the various short tubes 54 on guide tubes 10, thereby covering the same by the new end part 53 which, to this end, has the same number of bores 55 as there are tubes 10 in the assembly in question, i.e. 24 in the present case. Tubes 54 partly cover with gentle friction the upper portion of guide tubes 10. This is followed by deformation (e.g. expansion by rolling) of the short tubes 54 and of the upper part of guide tubes 10 so as to obtain annular radial performances 56 ensuring the fixing of the new upper part 53 to the various guide tubes 10 of the assembly.

This possibility of disassembling the upper end part for carrying out maintenance operations on the fuel rods in one of the many important advantages provided by the present invention.

What is claimed is:

1. In a light water nuclear reactor incorporating guide tubes for the fuel assemblies of said nuclear reactors, said assemblies being immersed in operation in the cooling water of the core of such a reactor, the guide tubes being of the type made from zircaloy and fixed at their two ends respectively to an upper end part and a lower end part made from stainless steel or Inconel and which incorporate devices for braking the fall of the control rods which they house during the rapid shutdown of the reactor, the improvement wherein said braking devices comprise means for restricting the diameter of the guide tubes comprising for each guide tube a zircaloy inner sleeve spot welded to the said guide tube and whose internal diameter permits the passage, with a calibrated clearance, of the corresponding control rod, the sleeve being distributed over an area of the lower portion of each guide tube, representing approximately 1/7 of its height and associated with orifices in the actual guide tubes to produce the progressive hydraulic absorption of the end of the fall of the control rods and wherein each guide tube of the fuel assembly is fixed to the upper end part by means of a conical end bore in which it is axially locked by means of a stainless steel plug fixed in the end part.

2. In a light water nuclear reactor incorporating guide tubes for the fuel assemblies of said nuclear reactors, said assemblies being immersed in operation in the cooling water of the core of such a reactor, the guide tubes being of the type made from zircaloy and fixed at their two ends respectively to an upper end part and a lower end part made from stainless steel or Inconel and which incorporate devices for braking the fall of the control rods which they house during the rapid shutdown of the reactor, the improvement wherein said braking devices comprise means for restricting the diameter of the guide tubes comprising for each guide tube a zircaloy inner sleeve spot welded to the said guide tube and whose internal diameter permits the passage, with a calibrated clearance, of the corresponding control rod, the sleeve being distributed over an area of the lower portion of each guide tube, representing approximately 1/7 of its height and associated with orifices in the actual guide tubes to produce the progressive hydraulic absorption of the end of the fall of the control rods and wherein each guide tube of the fuel assembly is fixed to the lower end part by means of a metal plug crimped or welded to the inner sleeve and joined to the lower end part by disassemblable mechanical means.

* * * * *